Jan. 26, 1932.  M. BERLIET  1,842,742
NONSLIPPING DEVICE FOR THE WHEELS OF MOTOR VEHICLES
Filed Nov. 22, 1929  2 Sheets-Sheet 1
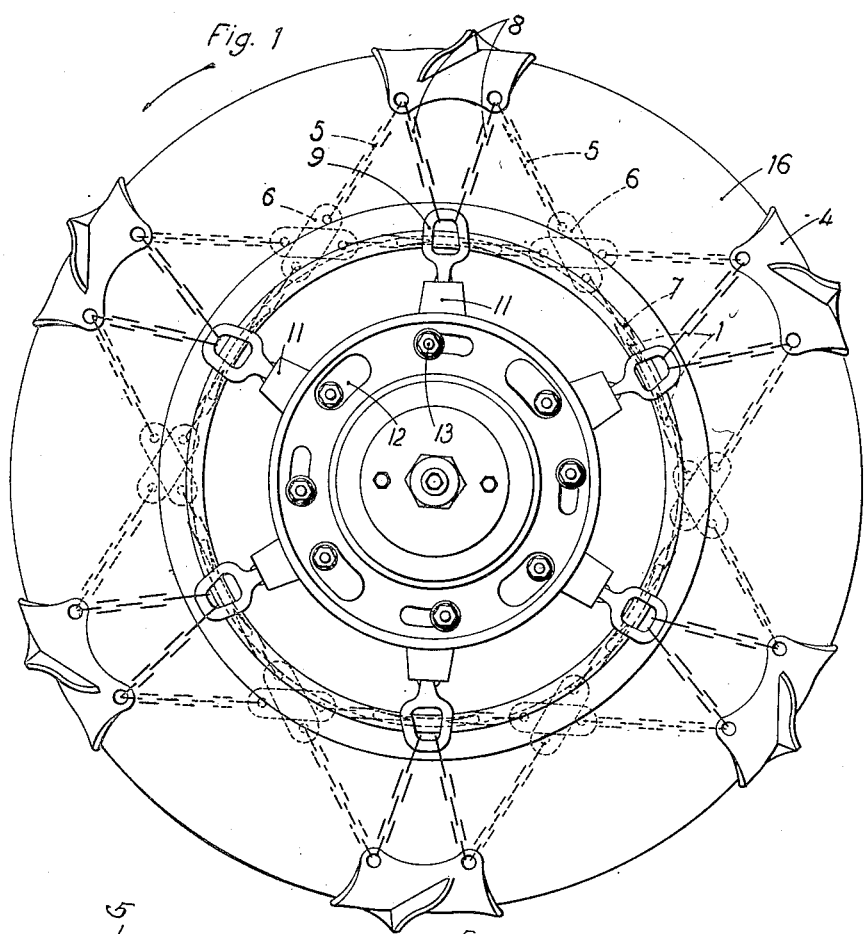
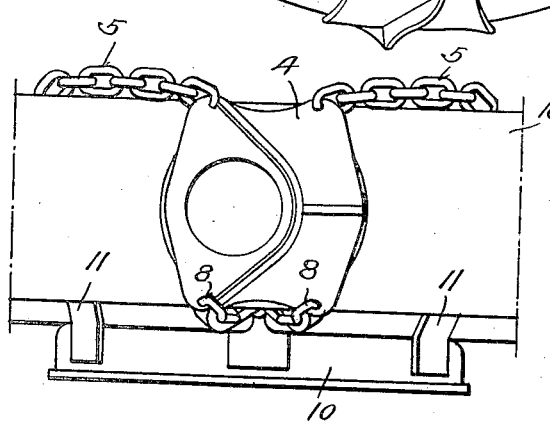
M. Berliet
INVENTOR Jan. 26, 1932.    M. BERLIET    1,842,742
NONSLIPPING DEVICE FOR THE WHEELS OF MOTOR VEHICLES
Filed Nov. 22, 1929    2 Sheets-Sheet 2

M. Berliet
INVENTOR

By Marks & Clerk
Attys.

Patented Jan. 26, 1932

1,842,742

UNITED STATES PATENT OFFICE

MARIUS BERLIET, OF VENISSIEUX, FRANCE, ASSIGNOR TO SOCIETE ANONYME: AUTOMOBILES M. BERLIET, OF VENISSIEUX, FRANCE, A CORPORATION OF FRANCE

NONSLIPPING DEVICE FOR THE WHEELS OF MOTOR VEHICLES

Application filed November 22, 1929, Serial No. 409,093, and in France October 2, 1929.

The present invention relates to improvements in means for attaching non-slipping shoes or like devices to the wheels of motor vehicles provided with solid rubber or pneumatic tires, said shoes being independent and also removable.

The following description, with reference to the accompanying drawings which are given by way of example, shows an embodiment of the said invention.

Fig. 1 is a general view of a wheel upon which the said shoes are mounted.

Fig. 3 is a plan view of Fig. 2.

Figure 2:
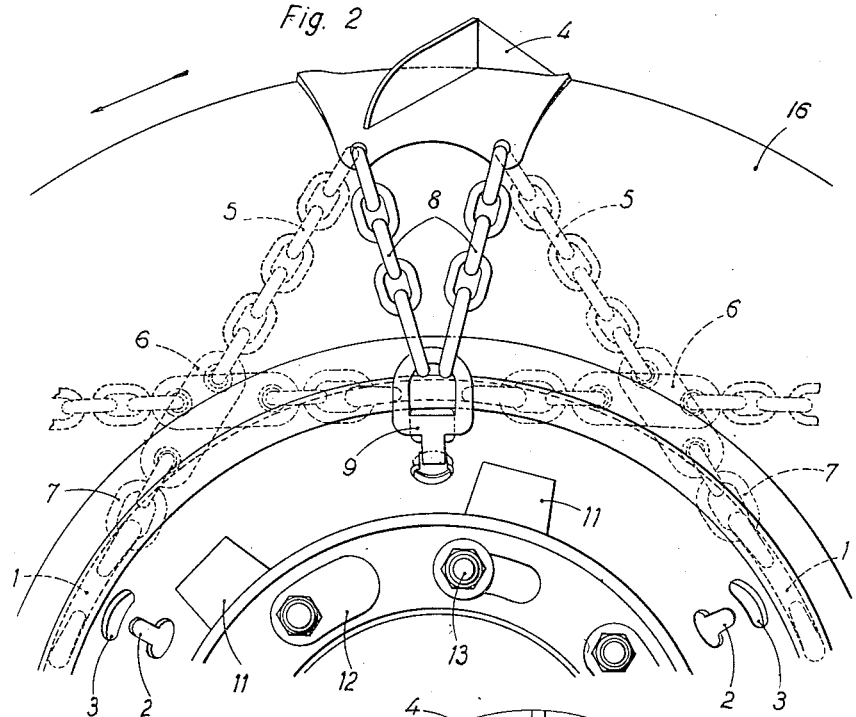
Fig. 2 is a front view, on a larger scale, of of portion of the wheel.

Before commencing the description of the protecting shoes and the means for attaching the same, it should be specified that each wheel must necessarily be provided with hooks of suitable length 1 disposed on the inner side of the wheel, and it must be pierced with apertures 2—3 of special shape which are formed in the web of the wheel adjacent the wheel rim holding the solid rubber or pneumatic tire.

Each wheel comprises six shoes, but it is possible, if the device must be very rapidly attached, to travel with only three shoes.

The main body of the shoe 4 is mounted upon the solid or the pneumatic tire, first, on the inner side of the wheel by means of two attaching chains 5 provided with crossing plates 6 by which the chains of the different shoes will slide upon one another, and said chains 5 are terminated by attaching rings 7 which cooperate with the corresponding hooks 1 permanently secured to the wheel; and second, on the outer side of the wheel, by two attaching chains 8, engaged in the ring of a latch-piece 9 provided with a rear button.

On the outer side of the wheel is mounted an attaching drum to which are secured a certain number of closing lugs 11. The drum 10 may be rotated with reference to the wheel, and it may be held upon the wheel in two positions by stud bolts 14 and nuts 13 traversing suitable slots 12 in the web of the wheel.

By the displacement of the drum 10 the lugs 11 are brought into coincidence with the said latches 9 when the latter are disposed in the apertures 2, to prevent their release.

A lever 15 of special shape is necessary for the mounting and the release of the shoes 4.

A shoe such as 4 is mounted in the following manner:

The nuts 13 are loosened, and the drum 10 is rotated in such manner that the lugs 11 will uncover the apertures 2—3 of the web of the wheel 16.

Figure 4:
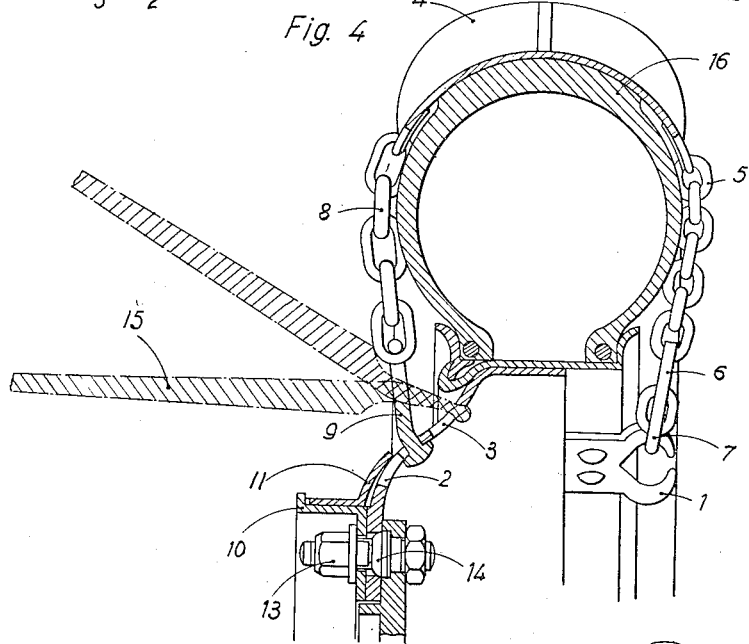
Fig. 4 is a cross-section of the wheel at a point adjacent one of the shoes.

The rings 7 are placed upon the hooks 1, and the shoe 4 is disposed upon the wheel 16; the lever 15 is then engaged at its end with the ring of the attaching latch 9 (Fig. 4). The end of the lever 15 rests upon the upper edge of the aperture 3, and the operator exercises a downward pressure until the button at the end of the latch 9 is engaged in the aperture 2 and engages below the edge of the middle part of said aperture.

The shoe 4 is then put in place, and the lever 15 is removed from the ring of the said latch. The drum 10 is then turned in such manner that the lugs 11 coincide with the apertures 2—3 and thus prevent all release of the button situated at the end of the latch 9 of the aperture 2, and the drum is then held in position by screwing the nuts 13.

The said shoe 4 is removed in the following manner. The drum 10 is rotated as shown in Fig. 2, so that the lugs 11 will be disengaged from the apertures 2 and 3; the lever 1 is engaged in the ring of the latch 9, and the operator rests this lever upon the upper edge of the aperture, and he exercises pressure by drawing the lever 15 towards him. In this manner, the said button of the latch 9 is released from the aperture 3, and the shoe 4 can be entirely removed by hand, by disengaging the rings 7 from the hooks 1. Obviously, the said arrangement for attaching the shoes can also be employed with twinned wheels without departing from the spirit of the invention.

Claims:

1. A device of the character described, including in combination, a wheel having a tire thereon, shoes on the tire, means having detachable connection with the wheel for fastening the shoes in position, a drum mounted for angular displacement on the wheel, and guard shoes carried by the drum for removable positioning over the engagement points of the detachable fastening means with the wheel so as to prevent accidental disengagement of the said latter means.

2. A device of the character described, including in combination, a wheel, a resilient tire thereon, shoes disposed about the outer periphery of the tire, flexible connections between one side of the wheel and the adjacent side edges of the shoes, headed fasteners flexibly connected to the opposite side edges of the shoes and provided with apertures, the wheel on the side adjacent the fasteners being provided with bayonet slots situated in predetermined relation to the fasteners so that engagement of the fasteners therewith is possible on compression of the tire, and the wheel being also provided with apertures positioned radially beyond the slots and adapted to receive a lever and form a fulcrum therefor subsequent to the latter being passed through the aperture in the fastener so that the tire may be compressed upon the swinging of the lever and the fastener engaged in the slot.

3. A device of the character described, including in combination, a wheel, a resilient tire thereon, shoes disposed about the outer periphery of the tire, flexible connections between one side of the wheel and the adjacent side edges of the shoes, headed fasteners flexibly connected to the opposite side edges of the shoes, the wheel on the side adjacent the fasteners being provided with bayonet slots situated in predetermined relation to the fasteners so that engagement of the fasteners therewith is possible on compression of the tire, a drum secured to the wheel in such manner that it is capable of being angularly displaced, and guard shoes on the periphery of the drum adapted to removably cover the bayonet slots to prevent accidental displacement of the fasteners.

In testimony whereof he has signed this specification.

MARIUS BERLIET.